(12) United States Patent
Siddam et al.

(10) Patent No.: US 8,744,428 B2
(45) Date of Patent: Jun. 3, 2014

(54) SUPPORTED FEATURE OVERRIDE

(75) Inventors: Kalyan Premchand Siddam, Nepean (CA); Lui Chu Yeung, Kanata (CA); Robert A. Mann, Carp (CA); Mira Vrbaski, Kanata (CA); Sachin J. Lalseta, Ottawa (CA); Partoo Mohebi-Sarmadi, Ottawa (CA); Haqing Ma, Nepean (CA)

(73) Assignee: Alcatel Lucent, Paris (FR)

( * ) Notice: Subject to any disclaimer, the term of this patent is extended or adjusted under 35 U.S.C. 154(b) by 232 days.

(21) Appl. No.: 13/275,678

(22) Filed: Oct. 18, 2011

(65) Prior Publication Data

US 2013/0095812 A1   Apr. 18, 2013

(51) Int. Cl.
  *H04W 4/00*   (2009.01)
(52) U.S. Cl.
  USPC .............................. 455/419; 719/313; 726/7
(58) Field of Classification Search
  CPC ........ H04M 8/245; H04L 63/08; G06F 9/546; G08B 25/08
  USPC ....... 455/419; 726/7; 719/313, 320; 340/506, 340/3.1
  See application file for complete search history.

(56) References Cited

U.S. PATENT DOCUMENTS

2008/0256593 A1  10/2008  Vinberg et al.
2010/0192212 A1*  7/2010  Raleigh ............................ 726/7

OTHER PUBLICATIONS

3rd Generation Partnership Project; Technical Specification Group Core Network and Terminals; Policy and Charging Control (PCC) over S9 reference point; Stage 3 (Release 11) 3rd Generation partnership project standard, 3GPP TS 29.215 V11.2.0 (Sep. 2011) Technical Specification; 650 Route Des Lucioles-Sophia Antipolis, Valbonne, France, paragraph4.5.2.1, paragraph 5.4.1.
International Search Report for PCT/CA2012/050730 dated Oct. 17, 2012.

* cited by examiner

*Primary Examiner* — Phuoc H Doan
(74) *Attorney, Agent, or Firm* — Kramer Amado P.C.

(57) ABSTRACT

Various exemplary embodiments relate to a method and related network node including one or more of the following: receiving, at the network device, a message; determining, in response to receiving the message, that a set of supported features should be transmitted to a partner device; determining, based on the partner device, whether a default set of features should be overridden; if the default set of supported features should be overridden, transmitting an alternative set of features to the partner device; and if the default set of supported features should not be overridden, transmitting a standard set of features based on the default set of features to the partner device.

17 Claims, 5 Drawing Sheets

| | 410 | 420 | 430 |
|---|---|---|---|
| | MCC | MNC | Override Features |
| 440 | 310 | 120 | 0011 |
| 450 | 310 | 090 | 0101 |
| 460 | ... | ... | ... |

SUPPORTED FEATURE OVERRIDE

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP has also recommended various procedures for providing roaming access to various users. 3GPP TS 29.215 provides that a visited PCRF may communicate, via an S9 session, with an attached user's home PCRF. Over this S9 session, the visited PCRF may retrieve information useful in providing data flows requested by a user.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for overriding supported features, the method including one or more of the following: receiving, at the network device, a message; determining, in response to receiving the message, that a set of supported features should be transmitted to a partner device; determining, based on the partner device, whether a default set of features should be overridden; if the default set of supported features should be overridden, transmitting an alternative set of features to the partner device; and if the default set of supported features should not be overridden, transmitting a standard set of features based on the default set of features to the partner device.

Various exemplary embodiments relate to a network device for overriding supported features, the network device including one or more of the following; an interface that receives a message; a roaming communication module configured to, in response to the interface receiving the message, determine that a set of supported features should be transmitted to a partner device; a default override module configured to determine, based on the partner device, whether a default set of features should be overridden; and a feature list constructor configured to: if the default set of supported features should be overridden, generate a feature list including an alternative set of features, and if the default set of supported features should be overridden, generate a feature list including a standard set of features based on the default set of features; and a negotiation module configured to transmit the feature list to the partner device.

Various exemplary embodiments relate to a tangible and non-transitory machine-readable storage medium encoded with instructions for execution by a network device for overriding supported features, the tangible and non-transitory machine-readable storage medium including one or more of the following: instructions for receiving, at the network device, a message; instructions for determining, in response to receiving the message, that a set of supported features should be transmitted to a partner device; instructions for determining, based on the partner device, whether a default set of features should be overridden; instructions for if the default set of supported features should be overridden, transmitting an alternative set of features to the partner device; and instructions for if the default set of supported features should not be overridden, transmitting a standard set of features based on the default set of features to the partner device.

Various embodiments are described wherein the step of determining, in response to receiving the message, that a set of supported features should be transmitted to a partner device includes determining that an S9 session should be established with the partner device.

Various embodiments are described wherein the step of transmitting the alternative set of features to the partner device includes transmitting an S9 message to the partner device, wherein the S9 message does not include a Supported-Features AVP.

Various embodiments are described wherein: the message is received from the partner device and includes a set of advertised features; and the step transmitting an alternative set of features to the partner device includes: identifying a set of allowed features based on a set of override features associated with the partner device, determining a set of agreed features based on the set of advertised features and the set of allowed features, and transmitting the set of agreed features to the partner device.

Various embodiments are described wherein: the message is received from another network device; and the step of transmitting an alternative set of features to the partner device includes: identifying a set of allowed features based on a set of override features associated with the partner device, transmitting the set of allowed features to the partner device.

Various embodiments are described wherein the step of determining, based on the partner device, whether a default set of supported features should be overridden includes determining whether the network device stores a set of override features in association with the partner device.

Various embodiments are described wherein: the network device and the partner device are both policy and charging rules nodes (PCRNs); and at least one of the network device and the partner device belong to home public land mobile network (HPLMN) of a user associated with the message.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
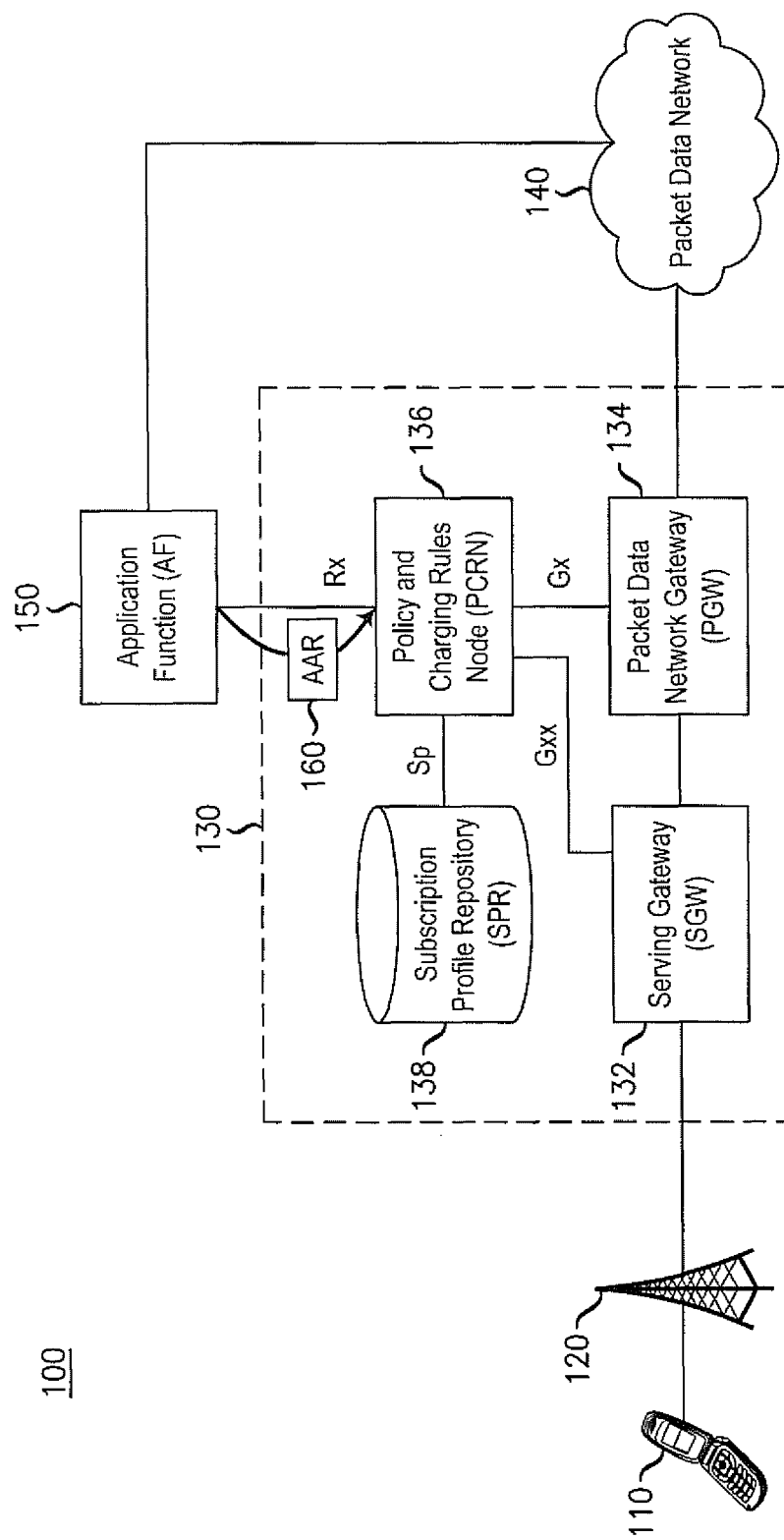
FIG. 1 illustrates an exemplary subscriber network for providing various data services.

The 3GPP standards are evolving standards and are continually updated to include expanded functionality. This, however, may create compatibility problems when nodes implemented according to different releases attempt to communicate. For example, a node implemented according to a recent version of the specifications may transmit a message to an older node. This older node may be unable to process the message because it would have been invalid and/or undefined under an older version of the specifications.

To provide backward compatibility when establishing a new S9 session, two policy and charging rules nodes (PCRNs) may first negotiate the set of features that will be supported on the session. For example, if a first PCRN is implemented according to release 10 of 3GPP TS 29.215, but a second PCRN is implemented according to release 9, the two PCRNs may limit their communications to that which is supported by release 9.

The 3GPP specifications specify that two PCRNs should communicate in an S9 session according to the entire set of features supported by both. In some circumstances, however, it may be desirable for two PCRNs to communicate with each other while excluding some features that are supported by both. For example, while two PCRNs may both support a feature, other devices in the network may not yet support the feature. As another example, while two PCRNs may both implement a feature, the different implementations may nonetheless be incompatible.

In view of the foregoing, it would be desirable to override the default behavior of a PCRN in negotiating a new S9 session for some partner PCRNs. In particular, it would be desirable to provide a method of negotiating a set of features between two PCRNs that excludes some features supported by both devices.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. In various embodiments, subscriber network 100 may be a public land mobile network (PLMN). Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SOW) 132 may be a device that provides gateway access to the EPC 130. SGW 132 may be one of the first devices within the EPC 130 that receives packets sent by user equipment 110. Various embodiments may also include a mobility management entity (MME) (not shown) that may receive packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SOW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber and/or an APN for an associated IP-CAN session, and/or an identification of the particular service data flows that must be established in order to provide the requested service. AF 150 may communicate such an application request to the PCRN 136 via the Rx interface.

Figure 2:
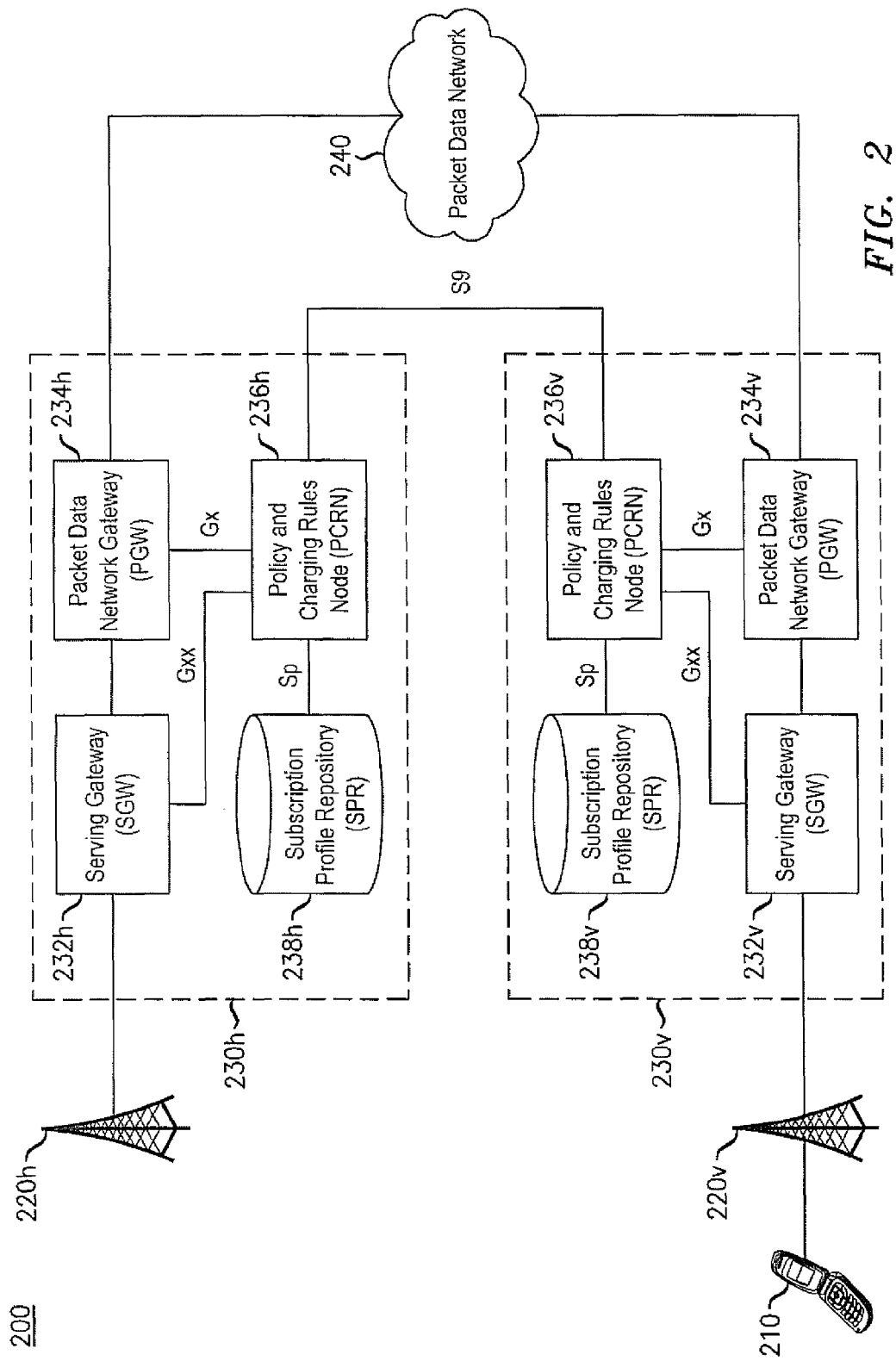
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230$v$ may provide visited access to packet data network 240 for roaming UEs such as UE 210, whereby traffic associated with UE 210 flows through SGW 232$v$ and PGW 234$v$. In various embodiments, EPC 230$v$ and EPC 230$h$ may connect to the same packet data network 240 (as shown) or may connect to two independent networks. Alternatively or additionally, EPC 230$v$ may provide home-routed access to packet data network 240 for roaming UEs such as UE 210, whereby traffic associated with UE 210 flows through SGW 232$v$ and PGW 234$h$. Accordingly, SGW 232$v$ may be in communication with PGW 234$h$. Likewise, SGW 232$h$ may be in communication with PGW 234$v$, such that EPC 230$h$ may provide similar access to other roaming UEs (not shown) attached to base station 220$h$.

UE 210 may be in communication with a base station 220$v$ but outside the range of base station 220$h$. Base station 220$v$, however, may not connect to a home public land mobile network (HPLMN) for the UE 210. Instead, base station 220$v$ may belong to a visited public land mobile network (VPLMN) with respect to the UE 210 and, as such, may not have access to various data associated with the UE 210, a subscriber associated therewith, and/or other data useful or necessary in providing connectivity to UE 210. For example, SPR 238$v$ may not include information associated with UE 210; instead, such information may be stored in SPR 238$h$. To enable the provision of service based on subscriber information stored in SPR 238$h$, PCRN 236$v$ may communicate with PCRN 236$h$ via an S9 session.

In various embodiments, PCRN 236$v$ may forward requests associated with UE 210 to PCRN 236$h$ via an S9 session. PCRN 236$h$ may process these messages to, for example, generate PCC and/or QoS rules. PCRN 236$h$ may then forward these rules to PCRN 236$v$ for installation on PGW 234$v$ and/or SGW 232$v$. In the case of home-routed access, PCRN 236$h$ may also install PCC rules directly on PGW 234$h$. In view of the cooperative nature of PCRNs 236$h$, 236$v$, these devices may be referred to as "partner devices" with respect to each other.

In various embodiments, each partner device may be capable of operating as a home device and a visited device. For example, if another roaming UE (not shown) were attached to base station 220$h$, PCRN 236$h$ may be additionally capable of forwarding requests to PCRN 236$v$ and PCRN 236$v$ may be capable of returning appropriate rules to PCRN 236$h$ for installation.

In establishing an S9 session, PCRNs 236$h$, 236$v$ may be configured to negotiate a set of features that will be supported for the session. In various embodiments, PCRNs 236$h$, 236$v$ may each be configured to perform this negotiation with respect to a default set of features such as, for example, the set of all features supported by the device. In such embodiments, the negotiated set of supported features may simply be the set of all features supported by both devices.

In various embodiments, at least one of the PCRNs 236h, 236v may be configured to override this default behavior with respect to the other PCRN 236h, 236v and, instead, negotiate based on an alternative set of features. For example, when advertising a set of features to PCRN 236h, PCRN 236v may be configured to not advertise support for release 10 of 3GPP TS 29.215, even though this feature may be implemented at PCRN 236v. As another example, when agreeing to a set of features in response to receiving an advertised set of features from PCRN 236v, PCRN 236h may be configured to not agree to support IP flow mobility, even though this feature was advertised by PCRN 236v and is supported by PCRN 236h.

Figures 3, 4:
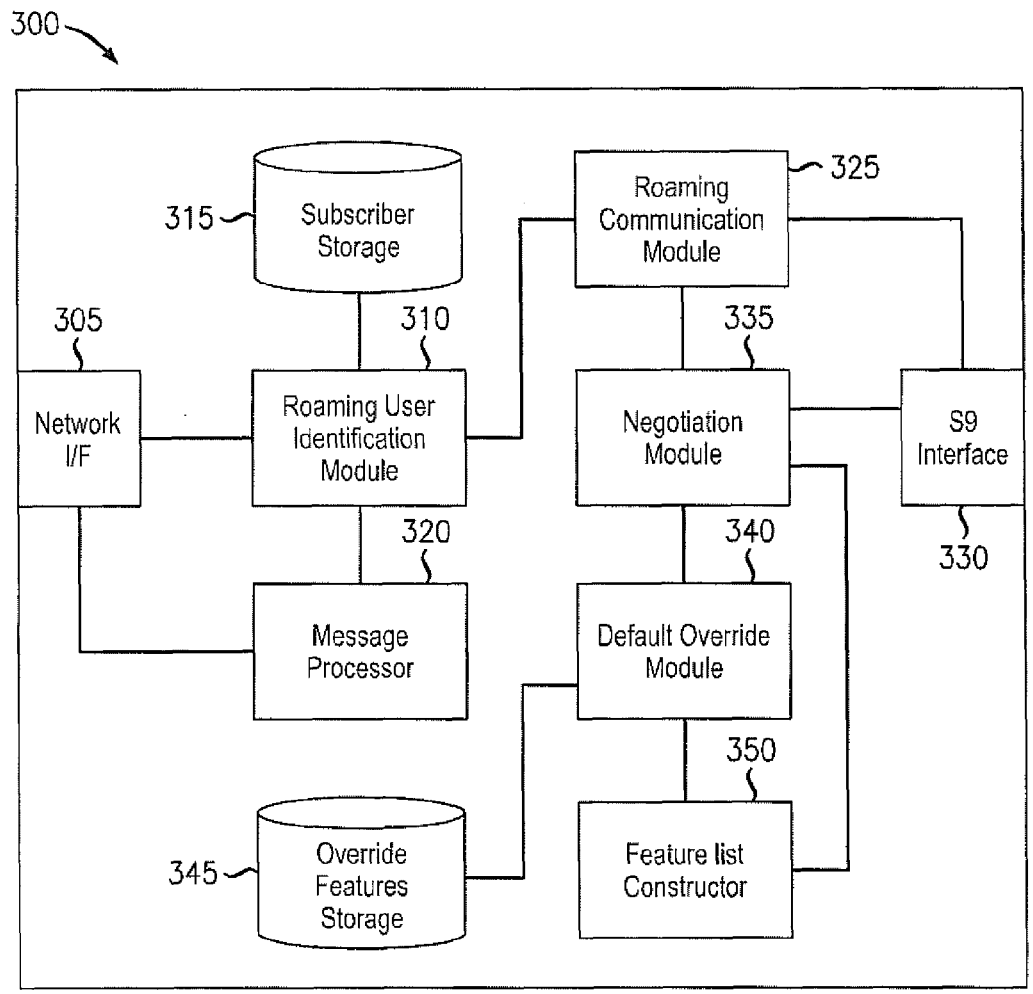
FIG. 3 illustrates an exemplary policy and charging rules node (PCRN)
FIG. 4 illustrates an exemplary data arrangement for storing override features.

FIG. 3 illustrates an exemplary policy and charging rules node (PCRN) 300. PCRN 300 may correspond to one or more of PCRNs 136, 236h, 236v. PCRN 300 may include a network interface 305, roaming user identification module 310, subscriber storage 315, message processor 320, roaming communication module 325, S9 interface 330, negotiation module 335, default override module 340, override features storage 345, and/or feature list constructor 350.

Network interface 305 may be an interface comprising hardware and/or executable instructions encoded on a machine-readable storage medium configured to communicate with at least one other device such as, for example, a PGW and/or AF. Accordingly, network interface 305 may include a Gx, Gxx, and/or Rx interface. In various embodiments, network interface 305 may be an Ethernet interface. During operation, network interface 305 may receive a request message from another device and forward the message to roaming user identification module.

Roaming user identification module 310 may include hardware and/or executable instructions on a machine-readable storage medium configured to determine whether a message received via network interface 305 is associated with a roaming user. As such, roaming user identification module 310 may use data carried by the message to determine whether subscriber storage 315 stores information about a subscriber associated with the message. For example, roaming user identification module 310 may extract one or more subscription identifiers from the request and determine whether subscriber storage stores a correlated record. Alternatively, if subscriber identifiers are not available in the message, roaming user identification module 310 may extract information sufficient to identify an IP-CAN session. Roaming user identification module 310 may then use an IP-CAN session record (not shown) to determine one or more subscription identifiers associated with the session. In various embodiments, roaming user identification module may take additional factors into consideration when determining whether a message is a roaming message or should be processed locally. For example, roaming user identification module 310 may extract an access point name (APN) from the message and determine whether the APN corresponds to a provider of emergency services. If so, the message may be treated as a non-roaming message even if the user is actually roaming. Various additional modifications will be apparent to those of skill in the art. If roaming user identification module 310 determines that a message is not associated with a roaming user or should otherwise be processed locally, roaming user identification module 310 may forward the message to message processor 320 for local handling. Otherwise, roaming user identification module 310 may forward the message to roaming communication module 325 for roaming handling.

Subscriber storage 315 may be any machine-readable medium capable of storing information related to various subscribers. Accordingly, subscriber storage 315 may include a machine-readable storage medium such as read-only memory (ROM), random-access memory (RAM), magnetic disk storage media, optical storage media, flash-memory devices, and/or similar storage media. Subscriber storage 315 may store a record for each subscriber known to the PCRN 300. In various embodiments, subscriber storage 315 may be a device that is external to PCRN 300. For example, subscriber storage 315 may be a subscription profile repository (SPR).

Message processor 320 may include hardware and/or executable instructions on a machine-readable storage medium configured to locally process various messages according to the 3GPP standards. For example, message processor 320 may receive requests for the establishment of IP-CAN session and/or service data flows, generate PCC and/or QoS rules, and install the rules on a PGW and/or SGW. Various additional functionalities necessary or useful in implementing the 3GPP standards will be apparent to those of skill in the art.

Roaming communication module 325 may include hardware and/or executable instructions on a machine-readable storage medium configured to communicate with one or more partner devices via S9 interface 330. For example, when operating as part of a VPLMN, roaming communication module 325 may use an established S9 session to forward a request received from roaming user identification module 310 to a partner device in the appropriate HPLMN. Roaming communication module 325 may then receive a response from the partner device include one or more PCC and/or QoS rules for installation.

Roaming communication module 325 may also be capable of operating as a part of an HPLMN. In this capacity, roaming communication module may receive a message from a partner device via S9 interface including a forwarded request message. Roaming communication module may then forward the request message to message processor 320 such that the request may be fulfilled or denied. Message processor 320 may create one or more PCC and/or QoS rules, which roaming communication module 325 may return to the partner device. In various embodiments, message processor 320 may also install one or more PCC rules at a PGW in the HPLMN.

When roaming communication module 325 receives a message from roaming user identification module 310 or a partner device via S9 interface 330 roaming communication module 325 may determine whether communication with a partner device may proceed over an already-established S9 session. If so, roaming communication module 325 may proceed as described above. If, however, no established S9 session applies to this communication with the partner device, roaming communication module may indicate to negotiation module 335 that a new S9 session should be established with the partner device.

S9 interface 330 may be an interface comprising hardware and/or executable instructions encoded on a machine-readable storage medium configured to communicate with at least one partner device, such as another PCRN, according to the S9 protocol as described in 3GPP TS 29.215. In various embodiments, S9 interface 330 may be an Ethernet interface. S9 interface 330 may utilize the same hardware as network interface 305.

Negotiation module 335 may include hardware and/or executable instructions on a machine-readable storage medium configured to communicate with a partner device to establish a new S9 session. Such communication may be implemented in accordance with 3GPP TS 29.215. As part of establishing a new session, negotiation module may transmit a feature list including a set of supported features to the partner device. When negotiation module 335 determines that a feature list should be transmitted, negotiation module 335 may indicate to default override module 340 that such feature list should be generated. In doing so, negotiation module 335 may forward identification information of the partner device to default override module 340 and/or feature list constructor 350. In the case where PCRN 300 operates as a home PCRN, negotiation module 335 may also forward set of advertised features received from the partner device.

Default override module 340 may include hardware and/or executable instructions on a machine-readable storage medium configured to determine whether a default set of supported features should be overridden when establishing a new S9 session. To make this determination, default override module 340 use one or more partner device identifiers to determine whether an associated record stored in override features storage 345 includes a set of override features. For example, default override module may use a mobile country code (MCC) and mobile network code (MNC) to attempt to locate a record in override features storage. If such a record exists default override module 340 may determine that the default set of features should be overridden. In various alternative embodiments, the records in override features storage 345 may include a flag indicating whether the default set of features should be overridden; in such embodiments, record presence alone may not indicate whether the default set should be overridden.

After determining that the default set of features should be overridden, default override module 340 may identify a set of override features to forward to feature list constructor 350. In various embodiments, this set of override features may be stored as part of the record corresponding to the partner device. Alternatively, default override module 340 may be configured to utilize only a single set of override features for all partner devices. For example, for any partner device for which the default set of features should be overridden, default override module 340 may be adapted to forward an empty feature set to feature list constructor 350, such that only base functionality may be supported on the new S9 session. Various modifications will be apparent to those of skill in the art.

It should also be noted that the decision to override the default set and/or the set of override features may not be directly correlated to the partner device. For example, in various embodiments, a number of roaming partners may be associated with a roaming agreement. This roaming agreement may specify a set of override features that is to be used for all roaming partners associated with the roaming agreement. As yet another example, the decision to override the default feature set may be made on a per-partner basis while the set of override features to be used in those cases may be defined in the roaming agreement. Various alternative embodiments will be apparent to those of skill in the art.

Override features storage 345 may be any machine-readable medium capable of storing indications of whether a default feature set should be overridden and/or a set of override features to be used for a particular partner device. Accordingly, override features storage 345 may include a machine-readable storage medium such as read-only memory (ROM), random-access memory (RAM), magnetic disk storage media, optical storage media, flash-memory devices, and/or similar storage media. Exemplary contents of override features storage 345 will be described in greater detail below, with respect to FIG. 4. In various embodiments, override features storage 345 may be implemented by the same physical device as subscriber storage 315.

Feature list constructor 350 may include hardware and/or executable instructions on a machine-readable storage medium configured to construct a feature list for transmission by negotiation module 335 to a partner device. For example, when PCRN 300 operates in a visited PCRN capacity, feature list constructor 350 may generate a list including a set of advertised features. This set of advertised features may be the same as a set of allowed features, determined as explained below.

Further, when PCRN 300 operates in a home PCRN capacity, feature list constructor 350 may receive a set of advertised features from the partner device and generate a list including a set of agreed features. The set of agreed features may specify which of the advertised features are also in a set of allowed features and therefore will be supported for the session. In either case, feature list constructor 350 may use a set of allowed features to determine the set of advertised or agreed features.

Unless default override module 340 indicates a set of override features, feature list constructor 350 may use a default set of features as the allowed set of features. In various embodiments, the default set of features may simply include the set of all features implemented by PCRN 300. In other embodiments, the default set of features may not include all implemented features; instead, some features may only be supported if specifically configured for a partner device and thus passed to feature list constructor 350 by default override module 340. On the other hand, if feature list constructor 350 does receive a set of override features from default override module 340, then feature list constructor 350 may use the override features as the set of allowed features instead.

After generating the feature list, feature list constructor 350 may return the feature list to negotiation module 335 such that it may be forwarded to a partner device. According to the foregoing, feature list may include a set of advertised or agreed features based on a set of override features. Such a feature list generated based on the set of override features may be referred to as including an "alternative set of features." In some cases, such as for example in the case of a set of advertised features, the alternative set of features may be the same as the set of override features. In other cases, such as for example, in the case of a set of agreed features, the alternative set of features may differ from, but still be based on, the override set of features.

Further, a feature list generated based on the default set of features may be referred to as including a "standard set of features." In some cases, such as for example in the case of a set of advertised features, the standard set of features may be the same as the default set of features. In other cases, such as for example, in the case of a set of agreed features, the standard set of features may differ from, but still be based on, the default set of features.

In various embodiments, the alternative set of features may be an empty set, indicating that only base functionality should be supported for the new S9 session. In such embodiments, the message transmitted to the partner device may omit the Supported-Features AVP. As such, the message may be interpreted to indicate that no features above base functionality should be supported.

FIG. 4 illustrates an exemplary data arrangement 400 for storing override features. Data arrangement 400 may be, for example, a group of tables in a database stored in override features storage 345 of PCRN 300. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include multiple data fields such as, for example, MCC fields 410, MNC field 420, and override features field 430. MCC field 410 may store a mobile country code (MCC) associated with a partner device. MNC field 420 may store a mobile network code (MNC) associated with a partner device. Together, MCC field 410 and MNC field 420 may uniquely identify a roaming partner device. Override features 430 may store an indication of a set of override features to be used for an associated roaming partner. As shown in the exemplary data arrangement 400, this indication may be a bitmask, as specified by 3GPP TS 29.215. Each bit may correspond to a particular feature, where a value of 1 indicates that the feature is supported while a value of 0 indicates that the feature is not supported.

As an example, record 440 may indicate that for the roaming partner with MCC 310 and MNC 120, the default set of features should be overridden and the bitmask 0011 should instead be used as a set of allowed features. As another example, record 450 may indicate that for the roaming partner with MCC 310 and MNC 090, the default set of features should be overridden and the bitmask 0101 should instead be used as a set of allowed features. Data arrangement 400 may include numerous additional records.

Figure 5:
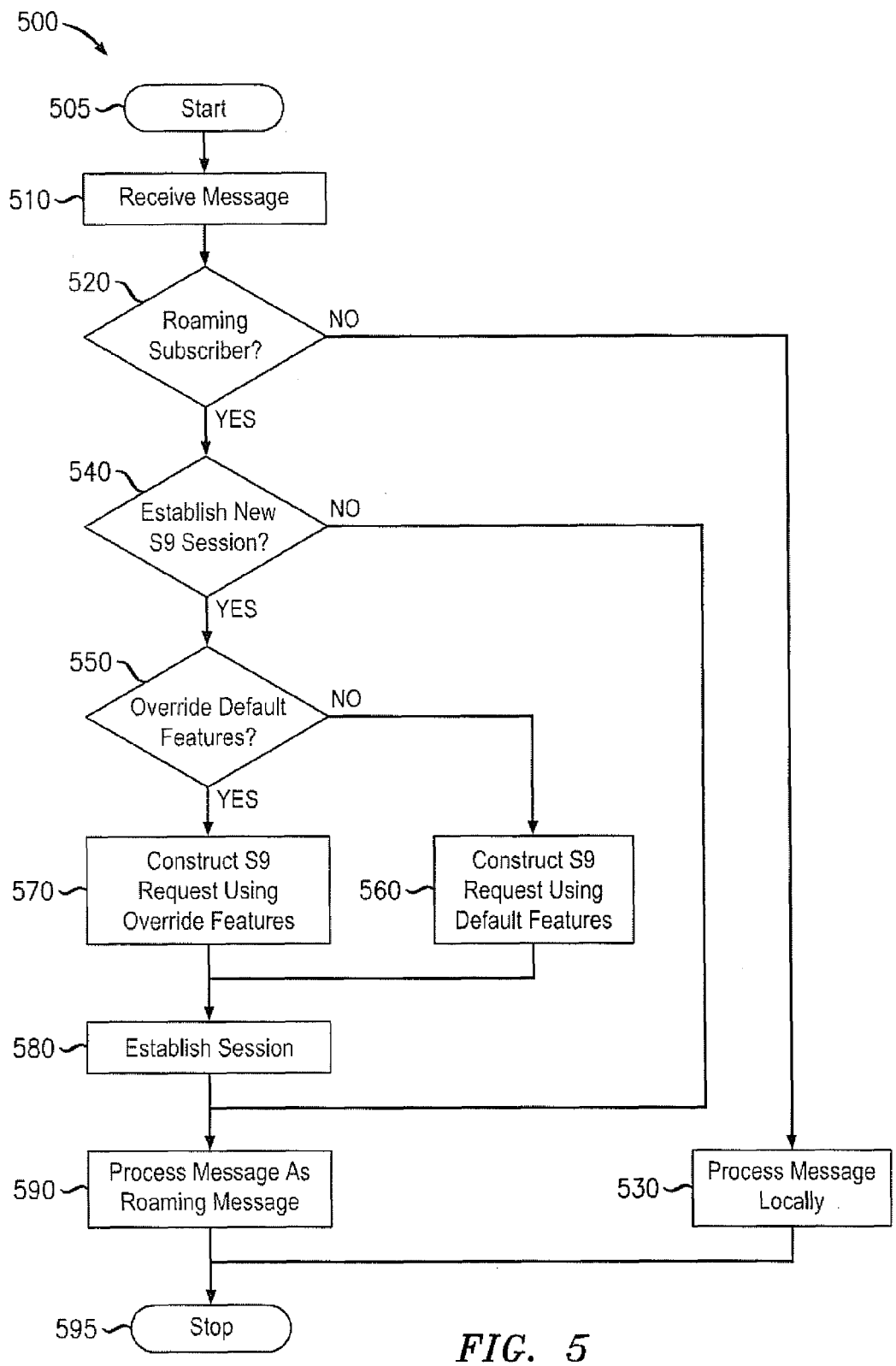
FIG. 5 illustrates an exemplary method for transmitting advertised features to a partner device.

FIG. 5 illustrates an exemplary method 500 for transmitting advertised features to a partner device. Exemplary method 500 may be performed by the components of a PCRN such as, for example, PCRN 300. In various embodiments, method 500 may be performed where the PCRN operates in a visited PCRN capacity.

Method 500 may begin in step 505 and proceed to step 510 where the PCRN may receive a message from another device. In step 520, the PCRN may determine whether the message is associated with a roaming subscriber. For example, the PCRN may determine whether the message is associated with any subscription identifiers known to the PCRN or any emergency APNs. If so, PCRN may determine that the message is not associated with a roaming subscriber and method 500 may proceed to step 530. In step 530, the PCRN may process the received message locally and method 500 may proceed to end in step 595.

If, on the other hand, the PCRN determines that the message is associated with a roaming subscriber, method 500 may proceed from step 520 to step 540. In step 540, the PCRN may determine whether a new S9 session should be established. For example, the PCRN may identify a home PCRN to process the message and determine whether an appropriate S9 session has already been established with that partner device. If so, method 500 may proceed to step 590. Otherwise, a new session should be established and method 500 may proceed to step 550.

In step 550, the PCRN may determine whether it should override the default set of features when establishing the new session. In various embodiments, PCRN may determine whether a record associated with the partner device indicates that a set of override features should be used instead of the default set. If the PCRN does not find such an indication, the PCRN may proceed to construct an S9 request using the default set of features as the set of advertised features in step 560. If the default set of features should be overridden, however, the PCRN may instead construct an S9 request using the set of override features as the set of advertised features in step 570. The S9 request generated in step 560 or 570 may be an S9 session establishment request.

Next, in step 580, the PCRN may establish the new S9 session by, for example, transmitting the S9 request constructed in step 560 or step 570 to the partner device. Then, in step 590, the PCRN may process the message using the newly established S9 session. For example, the PCRN may forward the message to the partner device and, subsequently, install one or more QoS and/or PCC rules received from the partner device in response. Method 500 may then proceed to end in step 595.

It should be noted that, in various embodiments, steps 580, 590 may overlap. For example, when establishing the session in step 580, the S9 request may additionally include the message, such that the message is forwarded to the partner device along with the set of advertised features. Additional modifications will be apparent to those of skill in the art.

Figure 6:
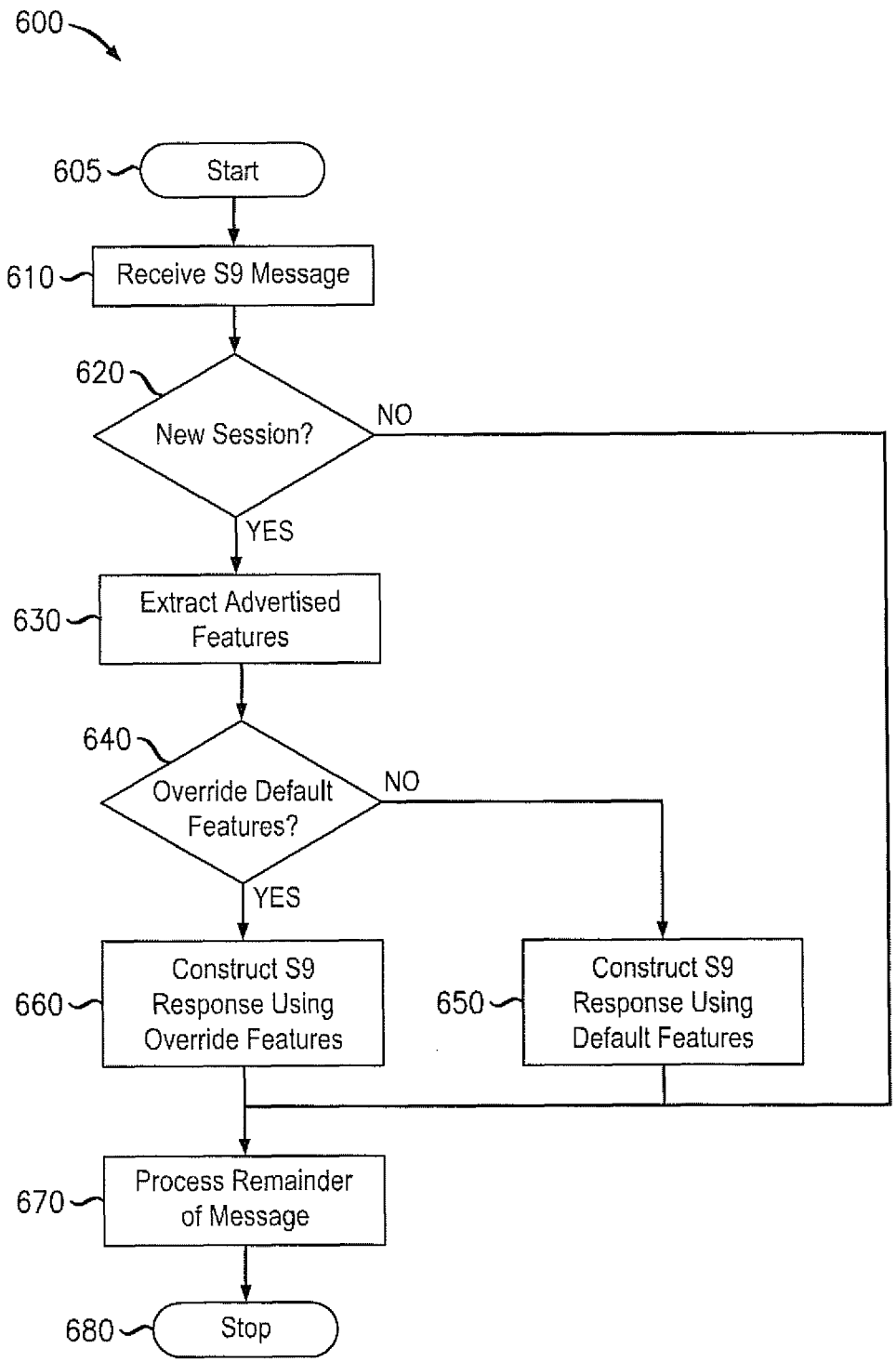
FIG. 6 illustrates an exemplary method for transmitting agreed features to a partner device.

FIG. 6 illustrates an exemplary method 600 for transmitting agreed features to a partner device. Exemplary method 600 may be performed by the components of a PCRN such as, for example, PCRN 300. In various embodiments, method 600 may be performed where the PCRN operates in a home PCRN capacity.

Method 600 may begin in step 605 and proceed to step 610 where the PCRN may receive an S9 message from a partner device. In step 620, the PCRN may determine whether a new S9 session should be created. For example, the PCRN may examine the received message to determine whether it requests the establishment of a new session. If the message is associated with an already-established S9 session, method 600 may proceed to step 670. Otherwise, method 600 may proceed to step 630.

In step 630, the PCRN may extract a set of advertised features from the received message. Then, in step 640, the PCRN may determine whether it should override the default set of features in responding to the S9 request. In various embodiments, the PCRN may determine whether a record associated with the partner device indicates that a set of override features should be used as a set of allowed features instead of the default set. If the PCRN does not find such an indication, the PCRN may proceed to construct an S9 request using the default set of features as the set of allowed features in step 650. If the default set of features should be overridden, however, the PCRN may instead construct an S9 request using the set of override features as the set of allowed features in step 660. In either step 650 or 660, the PCRN may determine a set of agreed features by determining which features the set of advertised features and set of allowed features have in common. For example, if both sets are bitmasks, the PCRN may use the logical conjunction of the set of advertised features and the set of allowed features to produce the set of agreed features. Finally, in step 670, the PCRN may continue to process the remainder of the received message. For example, the PCRN may generate one or more QoS/PCC rules, install rules on a PGW, forward such rules to the partner device, and/or transmit the set of agreed features to the partner device to complete S9 session establishment. Method 600 may then proceed to end in step 680.

According to the foregoing, various embodiments enable a PCRN to override the default behavior in negotiating supported features for an S9 session. In particular, by providing sets of override features for particular partner devices, a PCRN may negotiate a set of supported features that excludes various features supported by both the PCRN and partner device.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for overriding supported features, the method comprising:
   receiving, at the network device, a message;
   determining, in response to receiving the message, that a set of supported features should be transmitted to a partner device;
   determining, based on the partner device, whether a default set of features should be overridden;
   if the default set of supported features should be overridden, transmitting an alternative set of features to the partner device; and
   if the default set of supported features should not be overridden, transmitting a standard set of features based on the default set of features to the partner device; and
   wherein:
   the message is received from another network device; and
   the step of transmitting an alternative set of features to the partner device comprises:
      identifying a set of allowed features based on a set of override features associated with the partner device,
      transmitting the set of allowed features to the partner device.

2. The method of claim 1, wherein the step of determining, in response to receiving the message, that a set of supported features should be transmitted to a partner device comprises determining that an S9 session should be established with the partner device.

3. The method of claim 1, wherein the step of transmitting the alternative set of features to the partner device comprises transmitting an S9 message to the partner device, wherein the S9 message does not include a Supported-Features AVP.

4. The method of claim 1, wherein:
   the message is received from the partner device and includes a set of advertised features; and
   the step transmitting an alternative set of features to the partner device comprises:
      identifying a set of allowed features based on a set of override features associated with the partner device,
      determining a set of agreed features based on the set of advertised features and the set of allowed features, and
      transmitting the set of agreed features to the partner device.

5. The method of claim 1, wherein the step of determining, based on the partner device, whether a default set of supported features should be overridden comprises determining whether the network device stores a set of override features in association with the partner device.

6. The method of claim 1, wherein:
   the network device and the partner device are both policy and charging rules nodes (PCRNs); and
   at least one of the network device and the partner device belong to home public land mobile network (HPLMN) of a user associated with the message.

7. A network device for overriding supported features, the network device comprising:
   an interface that receives a message;
   a roaming communication module configured to, in response to the interface receiving the message, determine that a set of supported features should be transmitted to a partner device;
   a default override module configured to determine, based on the partner device, whether a default set of features should be overridden; and
   a feature list constructor configured to:
      if the default set of supported features should be overridden, generate a feature list including an alternative set of features, and
      if the default set of supported features should be overridden, generate a feature list including a standard set of features based on the default set of features; and
   a negotiation module configured to transmit the feature list to the partner device, and wherein:
      the message is received from another network device;
      the default override module is further configured to identify a set of allowed features based on a set of override features associated with the partner device; and
      in generating a feature list including the default set of features, the feature list constructor is configured to generate a feature list including the set of allowed features.

8. The network device of claim 7, wherein in determining that a set of supported features should be transmitted to a partner device, the roaming communication module is configured to determine that an S9 session should be established with the partner device.

9. The network device of claim 7, wherein in transmitting the feature list to the partner device, the negotiation module is configured to transmit an S9 message to the partner device, wherein the S9 message does not include a Supported-Features AVP.

10. The network device of claim 7, wherein:
   the message is received from the partner device and includes a set of advertised features;
   the default override module is further configured to identify a set of allowed features based on a set of override features associated with the partner device; and
   in generating a feature list including an alternative set of features, the feature list constructor is configured to:

determine a set of agreed features based on the set of advertised features and the set of allowed features, and generate a feature list including the set of agreed features.

11. The network device of claim 7, wherein, in determining whether a default set of features should be overridden, the default override module is configured to determine whether the network device stores a set of override features in association with the partner device.

12. A tangible and non-transitory machine-readable storage medium encoded with instructions for execution by a network device for overriding supported features, the tangible and non-transitory machine-readable storage medium comprising:

instructions for receiving, at the network device, a message;

instructions for determining, in response to receiving the message, that a set of supported features should be transmitted to a partner device;

instructions for determining, based on the partner device, whether a default set of features should be overridden;

instructions for if the default set of supported features should be overridden, transmitting an alternative set of features to the partner device; and instructions for if the default set of supported features should not be overridden, transmitting a standard set of features based on the default set of features to the partner device; and wherein:

the message is received from another network device; and the instructions for transmitting an alternative set of features to the partner device comprise:

instructions for identifying a set of allowed features based on a set of override features associated with the partner device, instructions for transmitting the set of allowed features to the partner device.

13. The tangible and non-transitory machine-readable storage medium of claim 12, wherein the instructions for determining, in response to receiving the message, that a set of supported features should be transmitted to a partner device comprise instructions for determining that an S9 session should be established with the partner device.

14. The tangible and non-transitory machine-readable storage medium of claim 12, wherein the instructions for transmitting the alternative set of features to the partner device comprise instructions for transmitting an S9 message to the partner device, wherein the S9 message does not include a Supported-Features AVP.

15. The tangible and non-transitory machine-readable storage medium of claim 12, wherein:

the message is received from the partner device and includes a set of advertised features; and instructions for transmitting an alternative set of features to the partner device comprise:

instructions for identifying a set of allowed features based on a set of override features associated with the partner device, instructions for determining a set of agreed features based on the set of advertised features and the set of allowed features, and instructions for transmitting the set of agreed features to the partner device.

16. The tangible and non-transitory machine-readable storage medium of claim 12, wherein the instructions for determining, based on the partner device, whether a default set of supported features should be overridden comprise instructions for determining whether the network device stores a set of override features in association with the partner device.

17. The tangible and non-transitory machine-readable storage medium of claim 12, wherein:

the network device and the partner device are both policy and charging rules nodes (PCRNs); and at least one of the network device and the partner device belong to home public land mobile network (HPLMN) of a user associated with the message.

* * * * *